(12) United States Patent
Ren et al.

(10) Patent No.: US 11,940,546 B2
(45) Date of Patent: Mar. 26, 2024

(54) USER EQUIPMENT POSITION DETERMINATION USING AN UPLINK RANDOM ACCESS CHANNEL MESSAGE

(71) Applicant: QUALCOMM Incorporated, San Diego, CA (US)

(72) Inventors: Yuwei Ren, Beijing (CN); Huilin Xu, Temecula, CA (US); Alexandros Manolakos, Escondido, CA (US)

(73) Assignee: QUALCOMM Incorporated, San Diego, CA (US)

( * ) Notice: Subject to any disclaimer, the term of this patent is extended or adjusted under 35 U.S.C. 154(b) by 369 days.

(21) Appl. No.: 17/310,518

(22) PCT Filed: Feb. 10, 2020

(86) PCT No.: PCT/CN2020/074616
§ 371 (c)(1),
(2) Date: Aug. 6, 2021

(87) PCT Pub. No.: WO2020/173296
PCT Pub. Date: Sep. 3, 2020

(65) Prior Publication Data
US 2022/0099787 A1   Mar. 31, 2022

(51) Int. Cl.
*G01S 5/02* (2010.01)
*G01S 5/06* (2006.01)
(Continued)

(52) U.S. Cl.
CPC .......... *G01S 5/02213* (2020.05); *G01S 5/06* (2013.01); *H04L 5/0051* (2013.01); *H04W 74/0833* (2013.01)

(58) Field of Classification Search
CPC ..... G01S 5/02213; G01S 5/06; H04L 5/0051; H04L 5/0073; H04L 5/0078;
(Continued)

(56) References Cited

U.S. PATENT DOCUMENTS 9,392,621 B2   7/2016  Bachu et al.
10,006,984 B2  6/2018  Lightstone et al.
(Continued)

FOREIGN PATENT DOCUMENTS

CN   101931860 A   12/2010
CN   102550109 A   7/2012
(Continued)

OTHER PUBLICATIONS

International Search Report and Written Opinion—PCT/CN2019/076324—ISA/EPO—dated Dec. 5, 2019.
(Continued)

*Primary Examiner* — Kenneth T Lam
(74) *Attorney, Agent, or Firm* — Harrity & Harrity, LLP

(57) ABSTRACT

In some aspects, a base station may transmit, to a user equipment (UE), an instruction that triggers the UE to transmit an uplink random access channel (RACH) message, the instruction identifying a RACH preamble index corresponding to a RACH preamble to be used for the uplink RACH message; transmit, to a plurality of neighbor base stations, information that identifies the RACH preamble index; receive the uplink RACH message from the UE; receive, from the plurality of neighbor base stations, feedback that indicates respective timings with which the uplink RACH message was received by the plurality of neighbor base stations; and estimate a position of the UE based at least in part on a timing with which the uplink RACH message was received by the base station and at least two of the respective timings with which the uplink RACH message was received by the plurality of neighbor base stations.

29 Claims, 10 Drawing Sheets

(51) Int. Cl.
*H04L 5/00* (2006.01)
*H04W 74/0833* (2024.01)

(58) Field of Classification Search
CPC ............... H04L 5/0048; H04L 5/0094; H04W 74/0833; H04W 64/00
See application file for complete search history.

(56) References Cited

U.S. PATENT DOCUMENTS

| | | |
|---|---|---|
| 2010/0331012 A1 | 12/2010 | Zhang |
| 2013/0083683 A1 | 4/2013 | Hwang et al. |
| 2015/0256972 A1 | 9/2015 | Markhovsky et al. |
| 2015/0270890 A1* | 9/2015 | Vasavada ............... H04B 7/195 370/326 |
| 2017/0006539 A1* | 1/2017 | Kakishima ........... H04B 7/0617 |
| 2017/0238298 A1 | 8/2017 | Wang et al. |
| 2019/0342000 A1* | 11/2019 | Zheng ................ H04B 7/18517 |
| 2021/0329660 A1* | 10/2021 | Zhang ............... H04W 72/0446 |
| 2021/0329704 A1* | 10/2021 | Yang ...................... H04W 72/23 |
| 2021/0400707 A1* | 12/2021 | Shi .................... H04W 74/0833 |
| 2022/0132594 A1* | 4/2022 | Ren ....................... H04L 5/0051 |

FOREIGN PATENT DOCUMENTS

| | | | |
|---|---|---|---|
| CN | 105393574 A | 3/2016 | |
| CN | 107046677 A | 8/2017 | |
| CN | 107197506 A | 9/2017 | |
| CN | 108702275 A | 10/2018 | |
| WO | WO-2008016246 A1 * | 2/2008 | ............... G01S 5/10 |
| WO | 2016019354 A1 | 2/2016 | |
| WO | 2017142725 | 8/2017 | |
| WO | WO-2018033260 A1 | 2/2018 | |
| WO | 2018075401 A1 | 4/2018 | |
| WO | WO-2018064367 A1 | 4/2018 | |
| WO | WO-2018084765 A1 | 5/2018 | |
| WO | 2019027539 A1 | 2/2019 | |

OTHER PUBLICATIONS

International Search Report and Written Opinion—PCT/CN2020/074616—ISAEPO—dated Apr. 28, 2020.

"3rd Generation Partnership Project, Technical Specification Group Radio Access Network, NG Radio Access Network, Stage 2 Functional Specification of User Equipment, Positioning in NG-RAN (Release 15)", 3GPP Standard, Technical Specification, 3GPP TS 38.305, 3rd Generation Partnership Project, Mobile Competence Centre, 650, Route Des Lucioles, F-06921 Sophia-Antipolis Cedex, France, vol. RAN WG2, No. V15.2.0, Jan. 11, 2019, XP051591685, pp. 1-69, paragraph [05.1]—paragraph [05.4], paragraph [06.1]—paragraph [06.6].

Supplementary European Search Report—EP20763970—Search Authority—Munich—dated Nov. 3, 2022.

\* cited by examiner

USER EQUIPMENT POSITION DETERMINATION USING AN UPLINK RANDOM ACCESS CHANNEL MESSAGE

CROSS-REFERENCE TO RELATED APPLICATIONS

This application is a 371 national stage of PCT Application No. PCT/CN2020/074616 filed on Feb. 10, 2020, entitled "USER EQUIPMENT POSITION DETERMINATION USING AN UPLINK RANDOM ACCESS CHANNEL MESSAGE," which claims priority to Patent Cooperation Treaty (PCT) Application No. PCT/CN2019/076324, filed on Feb. 27, 2019, entitled "USER EQUIPMENT POSITION DETERMINATION USING AN UPLINK RANDOM ACCESS CHANNEL MESSAGE," which are hereby expressly incorporated by reference herein.

FIELD OF THE DISCLOSURE

Aspects of the present disclosure generally relate to wireless communication and to techniques and apparatuses for user equipment position determination using an uplink random access channel message.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (for example, bandwidth or transmit power, among other examples). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE) systems. LTE/LTE-Advanced is a set of enhancements to the Universal Mobile Telecommunications System (UMTS) mobile standard promulgated by the Third Generation Partnership Project (3GPP).

The above multiple access technologies have been adopted in various telecommunication standards to provide a common protocol that enables different user equipments (UEs) to communicate on a municipal, national, regional, and even global level. New Radio (NR), which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM or SC-FDM (for example, also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements are applicable to other multiple access technologies and the telecommunication standards that employ these technologies.

When a sounding reference signal (SRS) transmission is used for estimating a user equipment (UE) position, time domain aliasing may occur due to the SRS transmission being transmitted in non-contiguous frequency resources. This may lead to errors in determining the UE position.

SUMMARY

In some aspects, a method of wireless communication, performed by a base station, may include transmitting, to a user equipment (UE), an instruction that triggers the UE to transmit an uplink random access channel (RACH) message, the instruction identifying at least a RACH preamble index corresponding to a RACH preamble to be used for the uplink RACH message; transmitting, to a plurality of neighbor base stations, information that identifies at least the RACH preamble index; receiving the uplink RACH message from the UE; receiving, from the plurality of neighbor base stations, feedback that indicates respective timings with which the uplink RACH message was received by the plurality of neighbor base stations; and estimating a position of the UE based at least in part on a timing with which the uplink RACH message was received by the base station and at least two of the respective timings with which the uplink RACH message was received by the plurality of neighbor base stations.

In some aspects, a base station for wireless communication may include memory and one or more processors operatively coupled to the memory. The memory and the one or more processors may be configured to transmit, to a UE, an instruction that triggers the UE to transmit an uplink RACH message, the instruction identifying at least a RACH preamble index corresponding to a RACH preamble to be used for the uplink RACH message; transmit, to a plurality of neighbor base stations, information that identifies at least the RACH preamble index; receive the uplink RACH message from the UE; receive, from the plurality of neighbor base stations, feedback that indicates respective timings with which the uplink RACH message was received by the plurality of neighbor base stations; and estimate a position of the UE based at least in part on a timing with which the uplink RACH message was received by the base station and at least two of the respective timings with which the uplink RACH message was received by the plurality of neighbor base stations.

In some aspects, a non-transitory computer-readable medium may store one or more instructions for wireless communication. The one or more instructions, when executed by one or more processors of a base station, may cause the one or more processors to: transmit, to a UE, an instruction that triggers the UE to transmit an uplink RACH message, the instruction identifying at least a RACH preamble index corresponding to a RACH preamble to be used for the uplink RACH message; transmit, to a plurality of neighbor base stations, information that identifies at least the RACH preamble index; receive the uplink RACH message from the UE; receive, from the plurality of neighbor base stations, feedback that indicates respective timings with which the uplink RACH message was received by the plurality of neighbor base stations; and estimate a position of the UE based at least in part on a timing with which the uplink RACH message was received by the base station and at least two of the respective timings with which the uplink RACH message was received by the plurality of neighbor base stations.

In some aspects, an apparatus for wireless communication may include means for transmitting, to a UE, an instruction that triggers the UE to transmit an uplink RACH message, the instruction identifying at least a RACH preamble index corresponding to a RACH preamble to be used for the uplink RACH message; means for transmitting, to a plurality of neighbor base stations, information that identifies at least the RACH preamble index; means for receiving the uplink RACH message from the UE; means for receiving, from the plurality of neighbor base stations, feedback that indicates respective timings with which the uplink RACH message was received by the plurality of neighbor base stations; and means for estimating a position of the UE based at least in part on a timing with which the uplink RACH message was received by the apparatus and at least two of the respective timings with which the uplink RACH message was received by the plurality of neighbor base stations.

In some aspects, a method of wireless communication, performed by a UE, may include receiving, from a base station, an instruction that triggers the UE to transmit an uplink RACH message, the instruction identifying at least a RACH preamble index corresponding to a RACH preamble to be used for the uplink RACH message; and transmitting the uplink RACH message using the RACH preamble, the uplink RACH message being used to estimate a position of the UE.

In some aspects, a UE for wireless communication may include memory and one or more processors operatively coupled to the memory. The memory and the one or more processors may be configured to receive, from a base station, an instruction that triggers the UE to transmit an uplink RACH message, the instruction identifying at least a RACH preamble index corresponding to a RACH preamble to be used for the uplink RACH message; and transmit the uplink RACH message using the RACH preamble, the uplink RACH message being used to estimate a position of the UE.

In some aspects, a non-transitory computer-readable medium may store one or more instructions for wireless communication. The one or more instructions, when executed by one or more processors of a UE, may cause the one or more processors to: receive, from a base station, an instruction that triggers the UE to transmit an uplink RACH message, the instruction identifying at least a RACH preamble index corresponding to a RACH preamble to be used for the uplink RACH message; and transmit the uplink RACH message using the RACH preamble, the uplink RACH message being used to estimate a position of the UE.

In some aspects, an apparatus for wireless communication may include means for receiving, from a base station, an instruction that triggers the apparatus to transmit an uplink RACH message, the instruction identifying at least a RACH preamble index corresponding to a RACH preamble to be used for the uplink RACH message; and means for transmitting the uplink RACH message using the RACH preamble, the uplink RACH message being used to estimate a position of the apparatus.

Aspects generally include a method, apparatus, system, computer program product, non-transitory computer-readable medium, user equipment, base station, wireless communication device, or processing system as substantially described herein with reference to and as illustrated by the accompanying drawings and specification.

The foregoing has outlined rather broadly the features and technical advantages of examples in accordance with the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only some typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and are not to be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art may appreciate that the scope of the disclosure is intended to cover any aspect of the disclosure disclosed herein, whether implemented independently of or combined with any other aspect of the disclosure. For example, an apparatus may be implemented or a method may be practiced using any quantity of the aspects set forth herein. In addition, the scope of the disclosure is intended to cover such an apparatus or method which is practiced using other structure, functionality, or structure and functionality in addition to or other than the various aspects of the disclosure set forth herein. Any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, or algorithms, among other examples (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with 3G or 4G wireless technologies, aspects of the present disclosure can be applied in other generation-based communication systems, such as 5G and later, including NR technologies.

When a sounding reference signal (SRS) transmission is used for estimating a user equipment (UE) position, time domain aliasing may occur due to the SRS transmission being transmitted in non-contiguous frequency resources. This may lead to errors in determining the UE position. Some techniques and apparatuses described herein assist with improving the accuracy of UE position determination using uplink signals.

Figure 1:
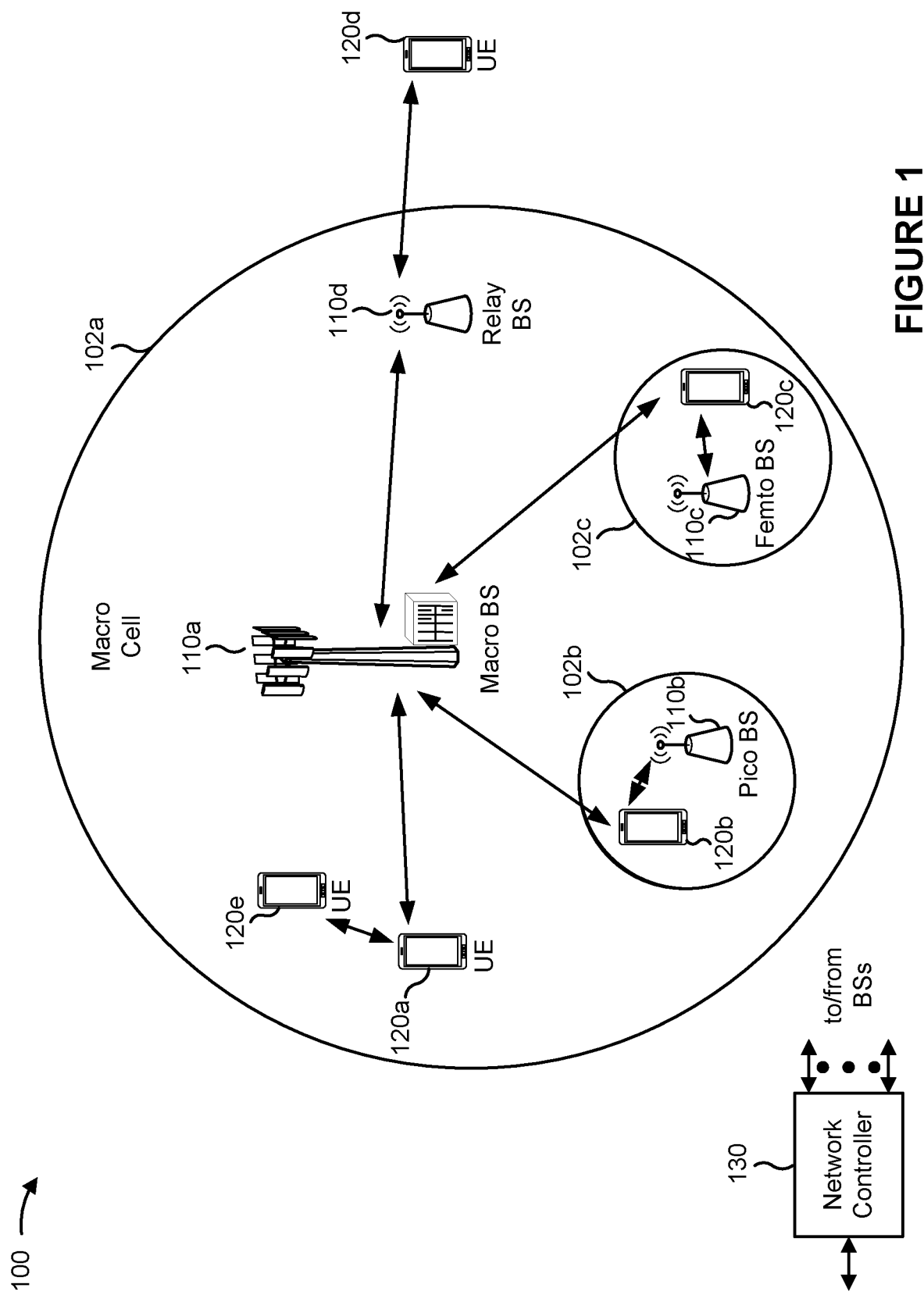
FIG. 1 is a block diagram illustrating an example wireless network in accordance with various aspects of the present disclosure.

FIG. 1 is a block diagram illustrating an example wireless network 100 in accordance with various aspects of the present disclosure. The wireless network 100 may be a Long Term Evolution (LTE) network or some other wireless network, such as a 5G or NR network. The wireless network 100 may include a quantity of base stations (BSs) 110 (shown as BS 110a, BS 110b, BS 110c, and BS 110d) and other network entities. A BS is an entity that communicates with user equipment (UE(s)) and may also be referred to as a Node B, an eNodeB, an eNB, a gNB, a NR BS, a 5G node B (NB), an access point (AP), or a transmit receive point (TRP), among other examples (these terms are used interchangeably herein). Each BS may provide communication coverage for a particular geographic area. In 3GPP, the term "cell" can refer to a coverage area of a BS or a BS subsystem serving this coverage area, depending on the context in which the term is used.

A BS may provide communication coverage for a macro cell, a pico cell, a femto cell, or another type of cell. A macro cell may cover a relatively large geographic area (for example, several kilometers in radius) and may allow unrestricted access by UEs with service subscription. A pico cell may cover a relatively small geographic area and may allow unrestricted access by UEs with service subscription. A femto cell may cover a relatively small geographic area (for example, a home) and may allow restricted access by UEs having association with the femto cell (for example, UEs in a closed subscriber group (CSG)). A BS for a macro cell may be referred to as a macro BS. A BS for a pico cell may be referred to as a pico BS. A BS for a femto cell may be referred to as a femto BS or a home BS. A BS may support one or multiple (for example, three) cells.

Wireless network 100 may be a heterogeneous network that includes BSs of different types, for example, macro BSs, pico BSs, femto BSs, or relay BSs, among other examples. These different types of BSs may have different transmit power levels, different coverage areas, and different impacts on interference in wireless network 100. For example, macro BSs may have a high transmit power level (for example, 5 to 40 Watts) whereas pico BSs, femto BSs, and relay BSs may have lower transmit power levels (for example, 0.1 to 2 Watts). In the example shown in FIG. 1, a BS 110a may be a macro BS for a macro cell 102a, a BS 110b may be a pico BS for a pico cell 102b, and a BS 110c may be a femto BS for a femto cell 102c. A network controller 130 may couple to the set of BSs 102a, 102b, 110a and 110b, and may provide coordination and control for these BSs. Network controller 130 may communicate with the BSs via a backhaul. The BSs may also communicate with one another, for example, directly or indirectly via a wireless or wireline backhaul.

In some aspects, a cell may not be stationary; rather, the geographic area of the cell may move in accordance with the location of a mobile BS. In some aspects, the BSs may be interconnected to one another or to one or more other BSs or network nodes (not shown) in the wireless network 100 through various types of backhaul interfaces such as a direct physical connection or a virtual network, among other examples, using any suitable transport network.

Wireless network 100 may also include relay stations. A relay station is an entity that can receive a transmission of data from an upstream station (for example, a BS or a UE) and send a transmission of the data to a downstream station (for example, a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, or a relay, among other examples.

UEs 120 (for example, 120a, 120b, 120c) may be dispersed throughout wireless network 100, and each UE may be stationary or mobile. A UE may also be referred to as an access terminal, a terminal, a mobile station, a subscriber unit, or a station, among other examples. A UE may be a cellular phone (for example, a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (for example, smart ring, smart bracelet)), an entertainment device (for example, a music or video device, or a satellite radio), a vehicular component or sensor, smart meters/sensors, industrial manufacturing equipment, a global positioning system device, or any other suitable device that is configured to communicate via a wireless medium.

Some UEs may be considered machine-type communication (MTC) or evolved or enhanced machine-type communication (eMTC) UEs. MTC and eMTC UEs include, for example, robots, drones, remote devices, sensors, meters, monitors, or location tags, among other examples, that may communicate with a base station, another device (for example, remote device), or some other entity. A wireless node may provide, for example, connectivity for or to a network (for example, a wide area network such as Internet or a cellular network) via a wired or wireless communication link. Some UEs may be considered Internet-of-Things (IoT) devices or may be implemented as NB-IoT (narrowband internet of things) devices. Some UEs may be considered a Customer Premises Equipment (CPE). UE 120 may be included inside a housing that houses components of UE 120, such as processor components, or memory components, among other examples.

In general, any quantity of wireless networks may be deployed in a given geographic area. Each wireless network may support a particular radio access technology (RAT) and may operate on one or more frequencies or frequency channels. A frequency may also be referred to as a carrier. Each frequency may support a single RAT in a given geographic area in order to avoid interference between wireless networks of different RATs. In some cases, NR or 5G RAT networks may be deployed.

In some aspects, two or more UEs 120 (for example, shown as UE 120a and UE 120e) may communicate directly with one another using one or more sidelink channels (for example, without using a base station 110 as an intermediary). For example, the UEs 120 may communicate using peer-to-peer (P2P) communications, device-to-device (D2D) communications, a vehicle-to-everything (V2X) protocol (for example, which may include a vehicle-to-vehicle (V2V) protocol, or a vehicle-to-infrastructure (V2I) protocol, among other examples), or a mesh network, among other examples. In this case, the UE 120 may perform scheduling operations, resource selection operations, or other operations described elsewhere herein as being performed by the base station 110.

Figure 2:
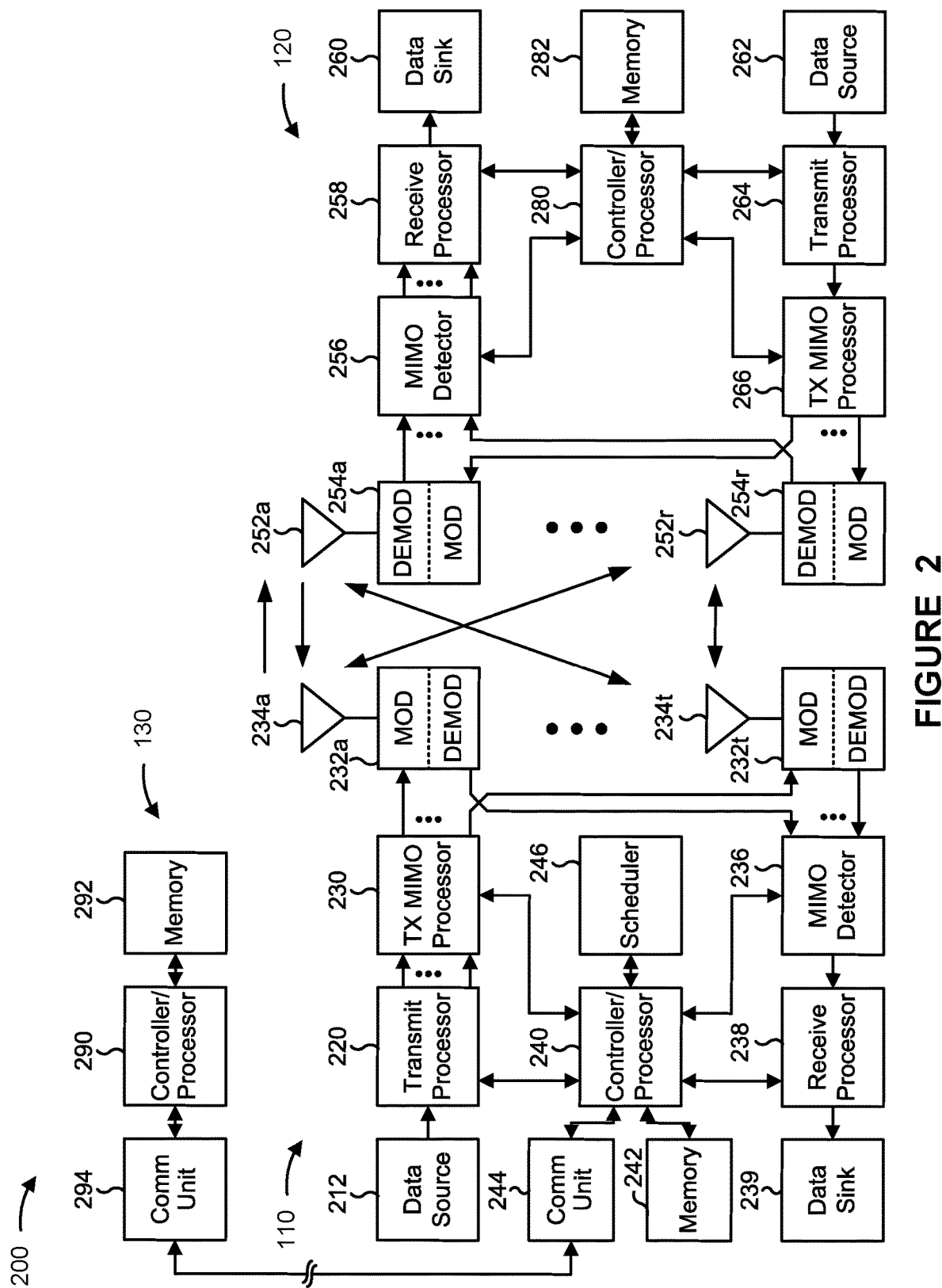
FIG. 2 is a block diagram illustrating an example base station (BS) in communication with a user equipment (UE) in a wireless network in accordance with various aspects of the present disclosure.

FIG. 2 is a block diagram 200 illustrating an example base station (BS) in communication with a user equipment (UE) in a wireless network in accordance with various aspects of the present disclosure. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCSs) for each UE based at least in part on channel quality indicators (CQIs) received from the UE, process (for example, encode) the data for each UE based at least in part on the MCS(s) selected for the UE, and provide data symbols for all UEs. Transmit processor 220 may also process system information (for example, for semi-static resource partitioning information (SRPI)) and control information (for example, CQI requests, grants, or upper layer signaling, among other examples) and provide overhead symbols and control symbols. Transmit processor 220 may also generate reference symbols for reference signals (for example, the cell-specific reference signal (CRS)) and synchronization signals (for example, the primary synchronization signal (PSS) and secondary synchronization signal (SSS)). A transmit (TX) multiple-input multiple-output (MIMO) processor 230 may perform spatial processing (for example, precoding) on the data symbols, the control symbols, the overhead symbols, or the reference symbols, if applicable, and may provide T output symbol streams to T modulators (MODs) 232a through 232t. Each MOD 232 may process a respective output symbol stream (for example, for OFDM) to obtain an output sample stream. Each MOD 232 may further process (for example, convert to analog, amplify, filter, and upconvert) the output sample stream to obtain a downlink signal. T downlink signals from MODs 232a through 232t may be transmitted via T antennas 234a through 234t, respectively. In accordance with various aspects described in more detail below, the synchronization signals can be generated with location encoding to convey additional information.

At UE 120, antennas 252a through 252r may receive the downlink signals from base station 110 or other base stations and may provide received signals to R demodulators (DEMODs) 254a through 254r, respectively. Each DEMOD 254 may condition (for example, filter, amplify, downconvert, and digitize) a received signal to obtain input samples. Each DEMOD 254 may further process the input samples (for example, for OFDM) to obtain received symbols. A MIMO detector 256 may obtain received symbols from all R DEMODs 254a through 254r, perform MIMO detection on the received symbols if applicable, and provide detected symbols. A receive processor 258 may process (for example, decode) the detected symbols, provide decoded data for UE 120 to a data sink 260, and provide decoded control information and system information to a controller/processor 280. A channel processor may determine a reference signal received power (RSRP), a received signal strength indicator (RSSI), a reference signal received quality (RSRQ), or a channel quality indicator (CQI), among other examples. In some aspects, one or more components of UE 120 may be included in a housing.

On the uplink, at UE 120, a transmit processor 264 may receive and process data from a data source 262 as well as control information (for example, for reports including RSRP, RSSI, RSRQ, or CQI, among other examples) from controller/processor 280. Transmit processor 264 may also generate reference symbols for one or more reference signals. The symbols from transmit processor 264 may be precoded by a TX MIMO processor 266 if applicable, further processed by MODs 254a through 254r (for example, for discrete Fourier transform spread orthogonal frequency division multiplexing (DFT-s-OFDM) or orthogonal frequency division multiplexing (OFDM) with a cyclic prefix (CP) (CP-OFDM), among other examples), and transmitted to base station 110. At base station 110, the uplink signals from UE 120 and other UEs may be received by antennas 234, processed by DEMODs 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controller/processor 240 of base station 110, controller/processor 280 of UE 120, or any other component(s) of FIG. 2 may perform one or more techniques associated with UE position determination using an uplink RACH message, as described in more detail elsewhere herein. For example, controller/processor 240 of base station 110, controller/processor 280 of UE 120, or any other component(s) of FIG. 2 may perform or direct operations of, for example, process 700 of FIG. 7, process 800 of FIG. 8, or other processes as described herein. Memories 242 and 282 may store data and program codes for base station 110 and UE 120, respectively. A scheduler 246 may schedule UEs for data transmission on the downlink or uplink.

In some aspects, base station 110 may include means for transmitting, to a UE, an instruction that triggers the UE to transmit an uplink RACH message, the instruction identifying at least a RACH preamble index corresponding to a RACH preamble to be used for the uplink RACH message; means for transmitting, to a plurality of neighbor base stations, information that identifies at least the RACH preamble index; means for receiving the uplink RACH message from the UE; means for receiving, from the plurality of neighbor base stations, feedback that indicates respective timings with which the uplink RACH message was received by the plurality of neighbor base stations; and means for estimating a position of the UE based at least in part on a timing with which the uplink RACH message was received by the apparatus and at least two of the respective timings with which the uplink RACH message was received by the plurality of neighbor base stations; among other examples. In some aspects, such means may include one or more components of base station 110 described in connection with FIG. 2.

In some aspects, UE 120 may include means for receiving, from a base station, an instruction that triggers the apparatus to transmit an uplink RACH message, the instruction identifying at least a RACH preamble index corresponding to a RACH preamble to be used for the uplink RACH message; and means for transmitting the uplink RACH message using the RACH preamble, the uplink RACH message being used to estimate a position of the apparatus; among other examples. In some aspects, such means may include one or more components of UE 120 described in connection with FIG. 2.

Figure 3:
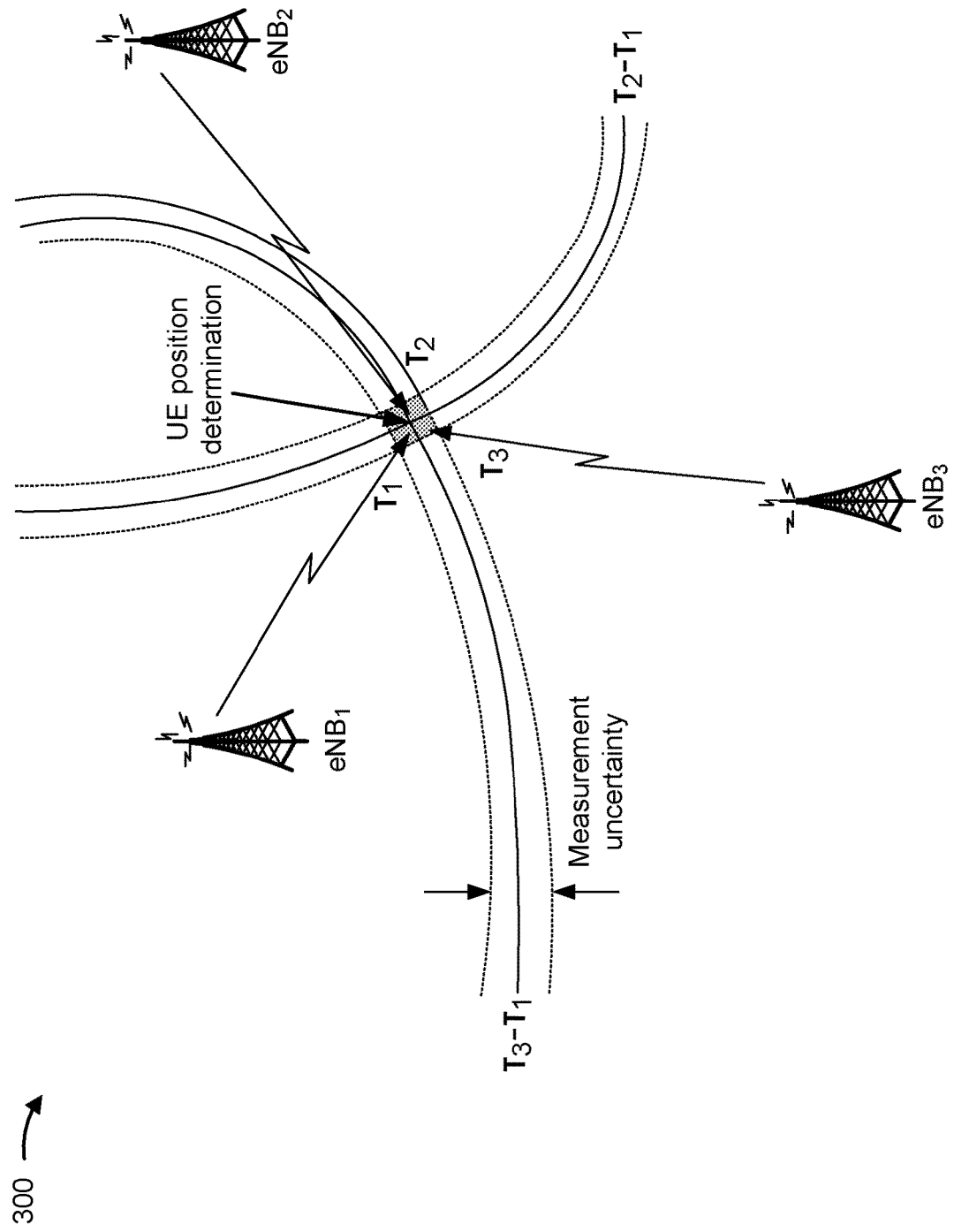
FIG. 3 is a diagram illustrating an example of UE position determination in accordance with various aspects of the present disclosure.

FIG. 3 is a diagram 300 illustrating an example of UE position determination in accordance with various aspects of the present disclosure. As shown in FIG. 3, measurements from at least three base stations 110 (shown as eNB$_1$, eNB$_2$, and eNB$_3$) may be used to determine a position of a UE 120.

In some scenarios, the UE 120 may use downlink reference signals to determine a position of the UE 120. For example, the UE 120 may use a downlink tracking reference signal (TRS) (sometimes referred to as a positioning reference signal (PRS)), such as one or more channel state information reference signals (CSI-RSs), to determine a position of the UE 120. In this case, multiple base stations 110 may transmit respective downlink reference signals. The UE 120 may receive those downlink reference signals and may measure a time difference of arrival (TDOA) between different downlink reference signals.

For example, the UE 120 may measure a first reference signal time difference (RSTD) between a first timing (shown as $\tau_1$) at which a first downlink reference signal is received from a first base station 110 (shown as eNB$_1$, which may be a reference base station 110, such as a serving base station 110) and a second timing (shown as $\tau_2$) at which a second downlink reference signal is received from a second base station 110 (shown as eNB$_2$, which may be a neighbor base station 110), which is shown as $\tau_2$ minus $\Sigma_1$. Similarly, the UE 120 may measure a second RSTD between the first timing ($\tau_1$) and a third timing (shown as $\tau_3$) at which a third downlink reference signal is received from a third base station 110 (shown as eNB$_3$, which may be another neighbor base station 110), which is shown as $\tau_3$ minus $\tau_1$. The UE 120 may use the first RSTD and the second RSTD to determine a position of the UE 120 (with some measurement uncertainty), as shown.

In some cases, a base station 110 may determine a UE position in a similar manner. For example, the base station 110 may receive an uplink reference signal from a UE 120. The uplink reference signal may be an uplink TRS, such as one or more sounding reference signals (SRSs). In this case, the base station 110 (such as a serving base station 110) may receive the uplink reference signal from the UE 120 and may determine a timing at which the uplink reference signal was received. Two or more neighbor base stations 110 may also receive the uplink reference signal, may determine respective timings at which the uplink reference signal was received, and may indicate the respective timings to the base station 110. The base station 110 may use the timing measured by the base station 110 as well as the timings measured by the neighbor base station 110 to estimate the UE position. However, because SRSs (or other uplink reference signals used as an uplink TRS) may be transmitted in non-contiguous resource blocks with frequency gaps, using SRSs for UE position determination may result in inaccuracies due to time domain aliasing, as described below in connection with FIG. 4.

Figure 4:
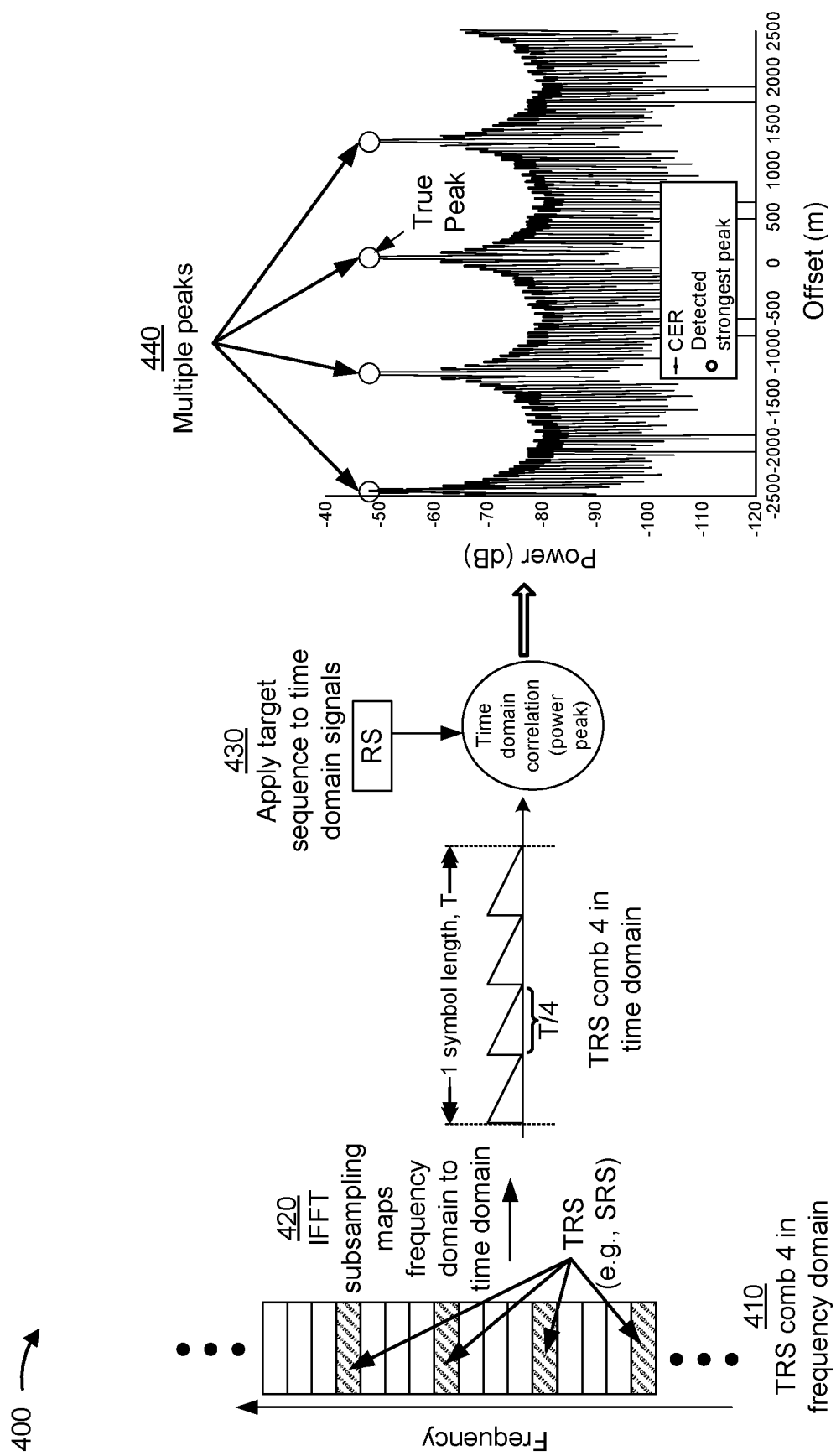
FIG. 4 is a diagram illustrating an example of time domain aliasing in connection with UE position determination in accordance with various aspects of the present disclosure.

FIG. 4 is a diagram 400 illustrating an example of time domain aliasing in connection with UE position determination in accordance with various aspects of the present disclosure. In a first operation 410, a base station 110 may receive an SRS transmission from a UE 120. The SRS transmission may include a set of SRSs transmitted on non-contiguous frequency resources. In FIG. 4, the TRS is shown as being transmitted every 4 sub-carriers (for example, every 4 resource blocks in the frequency domain) using a comb 4 transmission structure. In some cases, the TRS may be transmitted using another comb transmission structure, such as every 2 sub-carriers using a comb 2 transmission structure.

In a second operation 420, the base station 110 may apply an inverse fast Fourier transform (IFFT) to map frequency domain signals to the time domain using frequency domain subsampling. Due to this subsampling and the non-contiguous transmission of the TRS, the mapped signals may repeat in the time domain. For example, a comb 4 structure may result in a time domain signal repetition of 4 signals per symbol, as shown. Similarly, a comb 2 structure may result in a time domain signal repetition of 2 signals per symbol.

In a third operation 430, the base station 110 may apply a target sequence (for example, a reference sequence) to the time domain signals and may determine a time domain correlation between the target sequence and the time domain signals. In a fourth operation 440, due to the time domain signal repetition, the base station 110 may determine multiple correlation peaks (shown as 4 peaks due to the comb 4 structure). In some cases, the base station 110 may select a correlation peak that is not the true peak, which would introduce an error in determining a position of the UE 120. Some techniques and apparatuses described herein assist with improving the accuracy of UE position determination using uplink signals.

Figure 5:
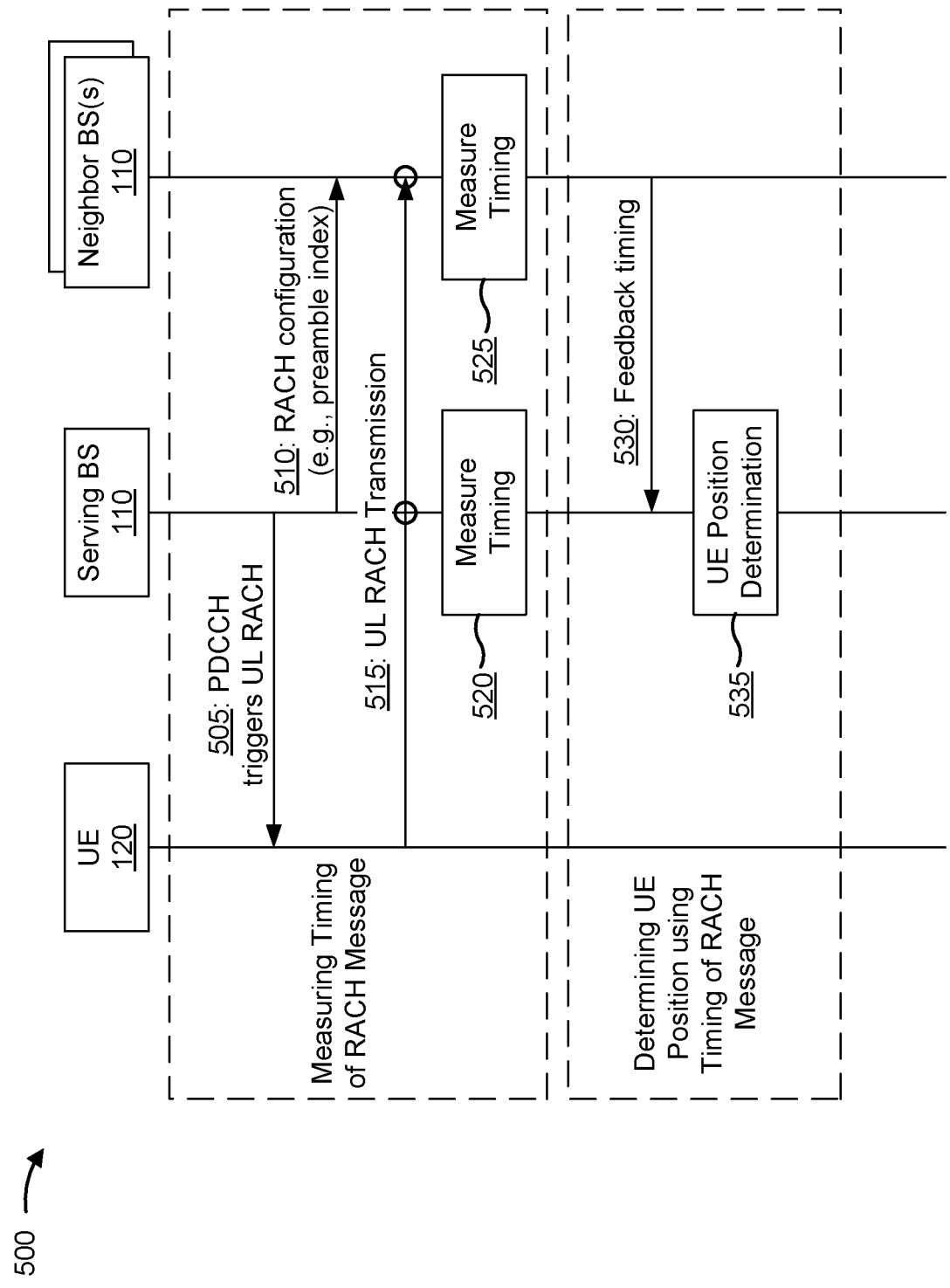
FIGS. 5-6 are diagrams illustrating examples of UE position determination using an uplink random access channel message in accordance with various aspects of the present disclosure.

FIG. 5 is a diagram 500 illustrating an example of UE position determination using an uplink random access channel message in accordance with various aspects of the present disclosure. As shown in FIG. 5, a UE 120 may be in communication with a serving base station 110 (for example, via a wireless interface), and the serving base station 110 may be in communication with a set of neighbor base stations 110 (for example, via a backhaul interface, which may include a wired interface, a wireless interface, or a combination thereof).

In a first operation 505, the serving base station 110 may transmit, to the UE 120, an instruction that triggers the UE 120 to transmit an uplink random access channel (RACH) message. As shown, in some aspects, the instruction may be transmitted in a physical downlink control channel (PDCCH). Such an operation may be referred to as PDCCH-ordered RACH. The instruction may indicate a RACH configuration to be used by the UE 120. The RACH configuration may identify, for example, a RACH preamble index corresponding to a RACH preamble to be used for the uplink RACH message, a RACH power configuration to be used to transmit the RACH message, or a RACH resource configuration to be used to transmit the RACH message (for example, a set of time domain resources, a set of frequency domain resources, or a set of spatial domain resources, among other examples, to be used to transmit the RACH message), among other examples. In some aspects, the RACH resource configuration may indicate contiguous resource blocks (for example, in contiguous frequency resources or sub-carriers) to prevent time domain aliasing.

In some aspects, the UE 120 may transmit, to the serving base station 110, a request to trigger transmission of the RACH message for positioning. For example, the UE 120 may detect a time aliasing issue associated with determining a position of the UE 120, such as the time aliasing issue described above in connection with FIG. 4. For example, the UE 120 may determine that multiple correlation peaks that satisfy a condition (for example, that are within a threshold amount of one another) have been detected in a same symbol. Based at least in part on this determination, the UE 120 may request PDCCH-ordered RACH, such as by transmitting a request to trigger transmission of the RACH message for positioning. Based at least in part on receiving this request, the serving base station 110 may transmit, to the UE 120, the instruction that triggers the UE 120 to transmit the RACH message, as described above. In some aspects, if the UE 120 is in a synchronized state with the serving base station 110, then the UE 120 may transmit the request in an uplink channel, such as a physical uplink control channel (PUCCH) or a physical uplink shared channel (PUSCH). In some aspects, if the UE 120 is not in a synchronized state with the serving base station 110, then the UE 120 may perform a RACH procedure to synchronize with the serving base station 110, and may then transmit the request for the PDCCH-ordered RACH for positioning.

In a second operation 510, the serving base station 110 may transmit, to multiple neighbor base stations 110 (for example, at least two neighbor base stations 110), the RACH configuration for the UE 120. The RACH configuration may indicate all or some of the information indicated to the UE 120 in the PDCCH-ordered RACH instruction, as described above. In some aspects, the RACH configuration transmitted to the neighbor base stations 110 may include at least the RACH preamble index. In some aspects, the RACH configuration transmitted to the neighbor base stations 110 may also include the RACH power configuration or the RACH resource configuration, among other examples.

In a third operation 515, the UE 120 may transmit the RACH message (sometimes referred to as an uplink RACH message) using the RACH configuration. For example, the UE 120 may transmit a RACH preamble, indicated by the configured RACH preamble index, in the RACH message. Additionally or alternatively, the UE 120 may transmit the RACH message using the indicated RACH power configuration or the indicated RACH resource configuration, among other examples. In some aspects, the UE 120 may transmit the RACH message in contiguous resource blocks to prevent time domain aliasing. The serving base station 110 may monitor for the RACH message based at least in part on the RACH configuration indicated to the UE 120. For example, the serving base station 110 may monitor for a RACH message that includes a RACH preamble corresponding to the indicated RACH preamble index. Additionally or alternatively, the serving base station 110 may monitor for a RACH message having a receive (Rx) power that satisfies a condition (for example, based at least in part on the indicated RACH power configuration), or may monitor for a RACH message in one or more resources indicated in the RACH resource configuration, among other examples. The neighbor base stations 110 may monitor for a RACH message in a similar manner, such as by using the RACH configuration indicated by the serving base station 110.

In a fourth operation 520, the serving base station 110 may receive the RACH message from the UE 120 (based at least in part on monitoring for the RACH message using the RACH configuration), and may measure a timing with which the RACH message was received by the serving base station 110. The timing may be an absolute timing or a relative timing, among other examples. Similarly, in a fifth operation 525, the neighbor base stations 110 may receive the RACH message from the UE 120 (based at least in part on monitoring for the RACH message using the RACH configuration), and may measure respective timings with which the RACH message was received by the neighbor base stations 110. For example, a first neighbor base station 110 may measure a first timing with which the RACH message was received by the first neighbor base station 110, a second neighbor base station 110 may measure a second timing with which the RACH message was received by the second neighbor base station 110, and so on for the multiple neighbor base stations 110 (which may include two neighbor base stations 110 or more than two neighbor base stations 110). In some aspects, a timing with which a RACH message is received may be referred to as a RACH timing.

In a sixth operation 530, the neighbor base stations 110 may transmit, to the serving base station 110, feedback that indicates the respective timings with which the RACH message was received by the neighbor base stations 110. For example, the first neighbor base station 110 may transmit a first message that indicates the first RACH timing to the serving base station 110, the second neighbor base station 110 may transmit a second message that indicates the second RACH timing to the serving base station 110, and so on for the multiple neighbor base stations 110.

In a seventh operation 535, the serving base station 110 may estimate a position of the UE 120 based at least in part on a timing with which the RACH message was received by the serving base station 110 and at least two of the respective timings with which the RACH message was received by the multiple neighbor base stations 110. For example, the serving base station 110 may estimate a position of the UE 120 using the timing with which the RACH message was received by the serving base station 110, a first timing indicated by the first neighbor base station 110, and a second timing indicated by the second neighbor base station 110. In some aspects, the serving base station 110 may also use one or more timings indicated by one or more additional neighbor base stations 110 to improve accuracy of the UE position estimate.

For example, the serving base station 110 may measure a first RSTD between the timing at which the RACH message is received by the serving base station 110 and a first timing at which the RACH message is received by a first neighbor base station 110. Similarly, the serving base station 110 may measure a second RSTD between the timing at which the RACH message is received by the serving base station 110 and a second timing at which the RACH message is received by a second neighbor base station 110. The serving base station 110 may use the first RSTD and the second RSTD to determine a position of the UE 120.

Because the RACH message is transmitted in contiguous resource blocks (for example, in contiguous sub-carriers), transmission of the RACH message may not have any frequency gaps. As a result, the time domain aliasing issues described above in connection with FIG. 4 are not introduced into measurement or processing of the RACH message, thereby reducing errors in determining a correlation peak (for example, since the serving base station 110 will not determine multiple peaks in a symbol). In this way, a position of the UE 120 can be estimated more accurately as compared to using a reference signal or message with frequency gaps (for example, due to a comb 2 structure or a comb 4 structure, among other examples).

In some aspects, the serving base station 110 may transmit, to the UE 120, information that indicates the estimated UE position. Additionally or alternatively, although the serving base station 110 is described herein as estimating a UE position using timing parameters, in some aspects, the UE 120 may estimate the UE position using these timing parameters. For example, the serving base station 110 may transmit, to the UE 120, information that identifies the timing measured by the serving base station 110, the first timing measured by the first neighbor base station 110, the second timing measured by the second neighbor base station 110, and so on for the multiple neighbor base stations 110. The UE 120 may use these timings to estimate a position of the UE 120.

As shown in FIG. 5, in some aspects, a position of the UE 120 may be determined directly from the RACH message without using an additional TRS or PRS, such as without using an SRS transmission. In some aspects, a position of the UE 120 may be determined using both the RACH message and an additional TRS or PRS, such as an SRS transmission, as described below in connection with FIG. 6.

Figure 6:
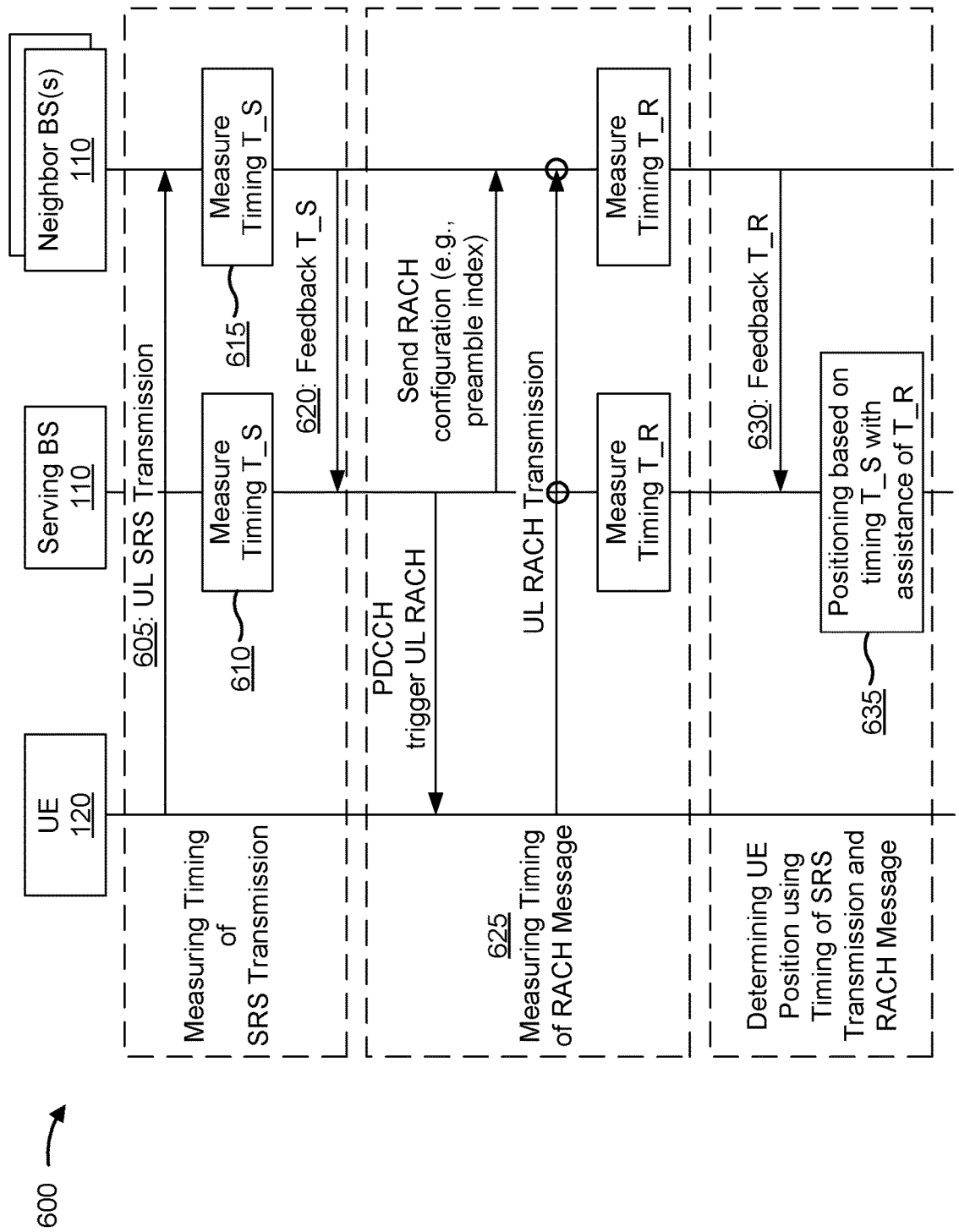

FIG. 6 is a diagram 600 illustrating an example of UE position determination using an uplink random access channel message in accordance with various aspects of the present disclosure. As shown in FIG. 6, a UE 120 may be in communication with a serving base station 110, and the serving base station 110 may be in communication with a set of neighbor base stations 110, as described above in connection with FIG. 5.

In a first operation 605, the UE 120 may transmit an SRS transmission (for example, one or more SRSs). For example, the UE 120 may transmit the SRS transmission using an SRS configuration, which may be indicated to the UE 120 by the serving base station 110. In some aspects, the UE 120 may transmit the SRS transmission in non-contiguous resource blocks (for example, due to a comb 2 structure or a comb 4 structure for the SRS transmission, which may be indicated in the SRS configuration), which may lead to time domain aliasing, as described above in connection with FIG. 4. The serving base station 110 may monitor for the SRS transmission based at least in part on the SRS configuration. For example, the serving base station 110 may monitor for one or more SRSs in one or more resources indicated in the SRS configuration. In some aspects, the serving base station 110 may indicate the SRS configuration to the neighbor base stations 110, and the neighbor base stations 110 may monitor for one or more SRSs in a similar manner, such as by using the SRS configuration indicated by the serving base station 110.

In a second operation 610, the serving base station 110 may receive the SRS transmission from the UE 120 (based at least in part on monitoring for the SRS transmission using the SRS configuration), and may measure a timing with which the SRS transmission was received by the serving base station 110 (shown as T_S, representing an SRS timing). The timing may be an absolute timing or a relative timing, among other examples. Similarly, in a third operation 615, the neighbor base stations 110 may receive the SRS transmission from the UE 120 (based at least in part on monitoring for the SRS transmission using the SRS configuration), and may measure respective timings with which the SRS transmission was received by the neighbor base stations 110. For example, a first neighbor base station 110 may measure a first timing with which the SRS transmission was received by the first neighbor base station 110, a second neighbor base station 110 may measure a second timing with which the SRS transmission was received by the second neighbor base station 110, and so on for the multiple neighbor base stations 110 (which may include two neighbor base stations 110 or more than two neighbor base stations 110). In some aspects, a timing with which an SRS transmission is received may be referred to as an SRS timing.

In a fourth operation 620, the neighbor base stations 110 may transmit, to the serving base station 110, feedback that indicates the respective timings with which the SRS transmission was received by the neighbor base stations 110. For example, the first neighbor base station 110 may transmit a first message that indicates the first SRS timing to the serving base station 110, the second neighbor base station 110 may transmit a second message that indicates the second SRS timing to the serving base station 110, and so on for the multiple neighbor base stations 110.

In a fifth operation 625, the UE 120 may transmit a RACH message (for example, using PDCCH-ordered RACH), the serving base station 110 may measure a RACH timing (shown as T_R) with which the RACH message was received by the serving base station 110, and the neighbor base stations may measure respective RACH timings with which the RACH message was received by the neighbor base stations 110. Additional details regarding this operation are described above in connection with FIG. 5 (for example, operations 505 through 525). In a sixth operation 630, the neighbor base stations 110 may transmit, to the serving base station 110, feedback that indicates the respective timings with which the RACH message was received by the neighbor base stations 110, in a similar manner as described in connection with operation 530 of FIG. 5.

In a seventh operation 635, the serving base station 110 may estimate a position of the UE 120 based at least in part on a timing with which the RACH message was received by the serving base station 110, at least two of the respective timings with which the RACH message was received by the multiple neighbor base stations 110, a timing with which the SRS transmission was received by the serving base station 110, and at least two of the respective timings with which the SRS transmission was received by the multiple neighbor base stations 110. For example, the serving base station 110 may estimate a position of the UE 120 using a RACH timing with which the RACH message was received by the serving base station 110, a first RACH timing indicated by the first neighbor base station 110, a second RACH timing indicated by the second neighbor base station 110, an SRS timing with which the SRS transmission was received by the serving base station 110, a first SRS timing indicated by the first neighbor base station 110, and a second SRS timing indicated by the second neighbor base station 110. In some aspects, the serving base station 110 may also use one or more RACH timings or one or more SRS timings indicated by one or more additional neighbor base stations 110 to improve accuracy of the UE position estimate.

In some aspects, the serving base station 110 may use the SRS transmission to identify multiple correlation peaks, as described above in connection with FIG. 4. The serving base station 110 may then use the RACH timing(s) to determine which correlation peak is the true peak to be used for UE position estimation. The true peak may indicate a timing value to be used to determine an RSTD. For example, the serving base station 110 may use a RACH timing, measured by the serving base station 110, to determine a timing value of multiple timing values indicated by an SRS timing measured by the serving base station 110. The serving base station 110 may use a first RACH timing, measured by the first neighbor base station 110, to determine a first timing value of multiple timing values indicated by the first SRS timing measured by the neighbor base station 110. The serving base station 110 may use the timing value and the first timing value to determine a first RSTD. The serving base station 110 may use a similar operation to determine a second RSTD (for example, using the RACH timing and the SRS timing measured by the serving base station 110 and a second RACH timing and a second SRS timing measured by a second neighbor base station 110). The serving base station 110 may use the first RSTD and the second RSTD to determine a position of the UE 120.

In some aspects, the RACH message and the SRS transmission may be quasi co-located. When two signals (or two beams used to carry the two signals) are quasi co-located, one or more properties of one of the signals (or beams) can be used to infer the corresponding one or more properties of the other signal (or beam), such as a delay spread, a Doppler spread, a frequency shift, an average gain, an average delay, an average receive power, or a receive timing, among other examples. When the RACH message and the SRS transmission are quasi co-located, this may ensure that these two signals use the same or similar timing properties or that a timing property of one of the signals can be inferred from a corresponding timing property of the other signal. As a result, the RACH message can be used to accurately compensate for timing inaccuracies resulting from use of the SRS transmission (for example, to select a peak from multiple peaks).

In some aspects, the serving base station 110 may transmit a configuration that indicates a quasi co-location (QCL) relationship between the RACH message and the SRS transmission. For example, this configuration may be transmitted to the UE 120, and the UE 120 may use this configuration when transmitting the RACH message or the SRS transmission, such as by transmitting these signals with the indicated QCL relationship. Additionally or alternatively, this configuration may be transmitted to the neighbor base stations 110, and the neighbor base stations 110 may use this configuration when monitoring for the RACH message or the SRS transmission, such as by monitoring for these signals using the indicated QCL relationship.

In some aspects, a fixed timing offset may be configured between the RACH message and the SRS transmission. For example, the RACH message may be transmitted or received in a first symbol (or a first set of symbols with the first symbol being a starting symbol of the first set of symbols), and the SRS transmission may be received in a second symbol (or a second set of symbols with the second symbol being a starting symbol of the second set of symbols). The timing offset between the first symbol and the second symbol may be fixed. For example, the SRS transmission may be configured with an SRS resource configuration that indicates a set of symbols that occur with a fixed offset from a set of symbols used for a RACH message. In this way, a RACH timing may be used to assist with UE position estimation using the SRS transmission, because a timing offset between the RACH message and the SRS transmission is fixed.

Because the RACH message is transmitted in contiguous resource blocks (for example, in contiguous sub-carriers), transmission of the RACH message may not have any frequency gaps. As a result, the time domain aliasing issues described above in connection with FIG. 4 that result from the non-contiguous frequency domain structure of SRS transmissions can be offset using the RACH message. Furthermore, by using both a RACH message and an SRS transmission to estimate a UE position, an accuracy of the estimate may be improved by using a greater number of reference signals as compared to using only the RACH message and not the SRS transmission.

In some aspects, the serving base station 110 may transmit, to the UE 120, information that indicates the estimated UE position. Additionally or alternatively, although the serving base station 110 is described herein as estimating a UE position using timing parameters, in some aspects, the UE 120 may estimate the UE position using these timing parameters. For example, the serving base station 110 may transmit, to the UE 120, information that identifies the RACH timing and the SRS timing measured by the serving base station 110, the first RACH timing and the first SRS timing measured by the first neighbor base station 110, the second RACH timing and the second SRS timing measured by the second neighbor base station 110, and so on for the multiple neighbor base stations 110. The UE 120 may use these timings to estimate a position of the UE 120.

Furthermore, although the serving base station 110 is described as transmitting the RACH configuration or the SRS configuration to multiple neighbor base stations 110, in some aspects, the serving base station 110 may transmit the RACH configuration or the SRS configuration to a single neighbor base station 110. In this case, the neighbor base station 110 may relay the RACH configuration or the SRS configuration to one or more other neighbor base stations 110.

Figure 7:
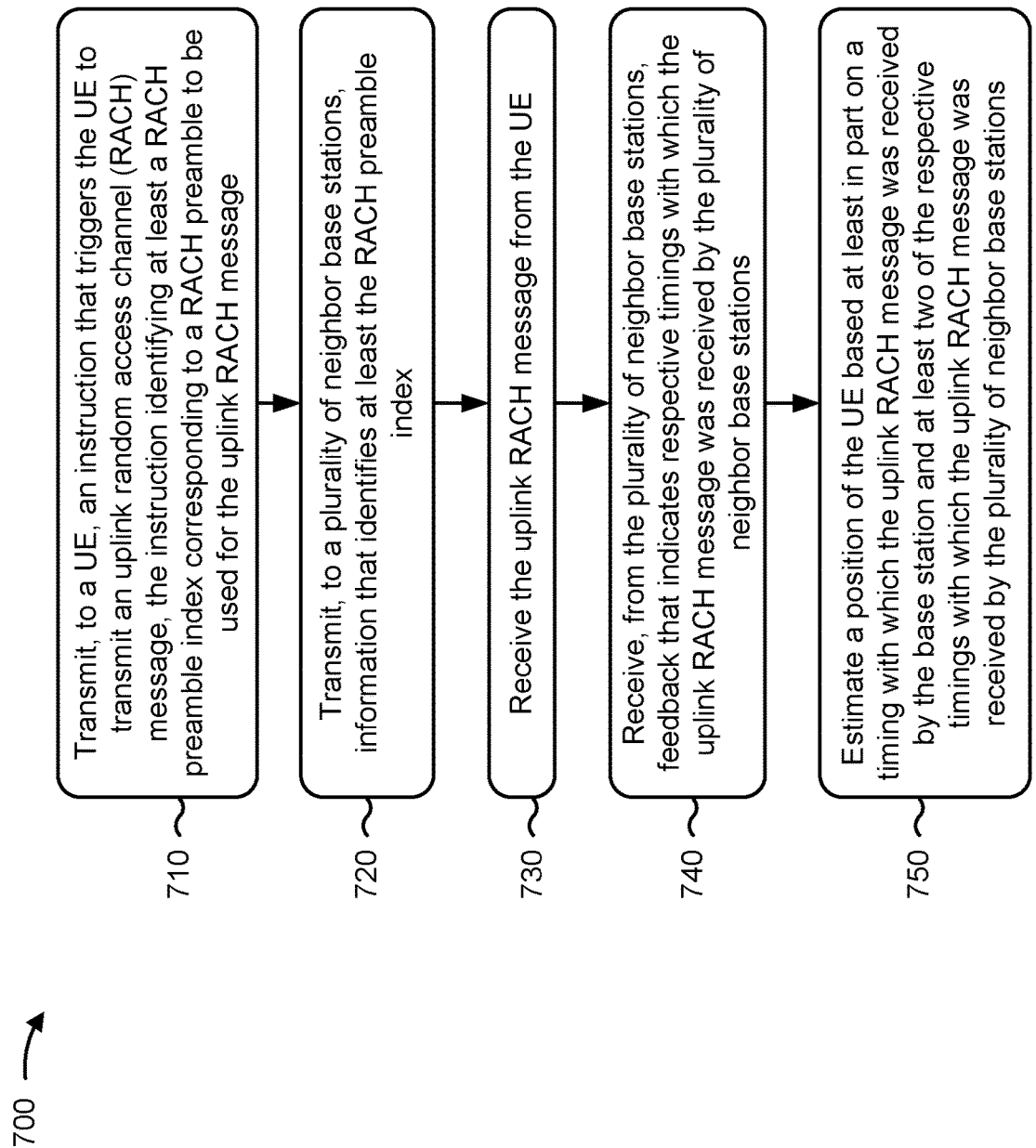
FIG. 7 is a diagram illustrating an example process performed by a base station in accordance with various aspects of the present disclosure.

FIG. 7 is a diagram illustrating an example process 700 performed, for example, by a base station in accordance with various aspects of the present disclosure. Example process 700 is an example where a base station (for example, base station 110) performs operations associated with UE position determination using an uplink RACH message.

As shown in FIG. 7, in some aspects, process 700 may include transmitting, to a UE, an instruction that triggers the UE to transmit an uplink RACH message, the instruction identifying at least a RACH preamble index corresponding to a RACH preamble to be used for the uplink RACH message (block 710). For example, the base station (for example, using controller/processor 240, transmit processor 220, TX MIMO processor 230, MOD 232, or antenna 234, among other examples) may transmit, to a UE, an instruction that triggers the UE to transmit an uplink RACH message, as described above. The instruction may identify at least a RACH preamble index corresponding to a RACH preamble to be used for the uplink RACH message.

As further shown in FIG. 7, in some aspects, process 700 may include transmitting, to a plurality of neighbor base stations, information that identifies at least the RACH preamble index (block 720). For example, the base station (for example, using controller/processor 240, transmit processor 220, TX MIMO processor 230, MOD 232, or antenna 234, among other examples) may transmit, to a plurality of neighbor base stations, information that identifies at least the RACH preamble index, as described above.

As further shown in FIG. 7, in some aspects, process 700 may include receiving the uplink RACH message from the UE (block 730). For example, the base station (for example, using antenna 234, DEMOD 232, MIMO detector 236, receive processor 238, or controller/processor 240, among other examples) may receive the uplink RACH message from the UE, as described above.

As further shown in FIG. 7, in some aspects, process 700 may include receiving, from the plurality of neighbor base stations, feedback that indicates respective timings with which the uplink RACH message was received by the plurality of neighbor base stations (block 740). For example, the base station (for example, using antenna 234, DEMOD 232, MIMO detector 236, receive processor 238, or controller/processor 240, among other examples) may receive, from the plurality of neighbor base stations, feedback that indicates respective timings with which the uplink RACH message was received by the plurality of neighbor base stations, as described above.

As further shown in FIG. 7, in some aspects, process 700 may include estimating a position of the UE based at least in part on a timing with which the uplink RACH message was received by the base station and at least two of the respective timings with which the uplink RACH message was received by the plurality of neighbor base stations (block 750). For example, the base station (for example, using controller/processor 240, among other examples) may estimate a position of the UE based at least in part on a timing with which the uplink RACH message was received by the base station and at least two of the respective timings with which the uplink RACH message was received by the plurality of neighbor base stations, as described above.

Process 700 may include additional aspects, such as any single aspect or any combination of aspects described below or in connection with one or more other processes described elsewhere herein.

In a first aspect, process 700 includes transmitting, to the UE, information that identifies the respective timings with which the uplink RACH message was received by the plurality of neighbor base stations. In a second aspect, alone or in combination with the first aspect, the instruction is transmitted in a physical downlink control channel. In a third aspect, alone or in combination with any of the first through second aspects, the uplink RACH message is received via contiguous resource blocks.

In a fourth aspect, alone or in combination with any of the first through third aspects, process 700 includes receiving a sounding reference signal (SRS) transmission from the UE; receiving, from the plurality of neighbor base stations, feedback that indicates respective timings with which the SRS transmission was received by the plurality of neighbor base stations; and estimating the position of the UE based at least in part on the timing with which the uplink RACH message was received by the base station, the at least two of the respective timings with which the uplink RACH message was received by the plurality of neighbor base stations, a timing with which the SRS transmission was received by the base station, and at least two of the respective timings with which the SRS transmission was received by the plurality of neighbor base stations.

In a fifth aspect, alone or in combination with any of the first through fourth aspects, the SRS transmission is received via non-contiguous resource blocks. In a sixth aspect, alone or in combination with any of the first through fifth aspects, process 700 includes selecting a timing, from multiple possible timings corresponding to multiple peak power measurements of the SRS transmission, based at least in part on the uplink RACH message. In a seventh aspect, alone or in combination with any of the first through sixth aspects, the uplink RACH message and the SRS transmission are quasi co-located. In an eighth aspect, alone or in combination with any of the first through seventh aspects, process 700 includes transmitting a configuration that indicates a quasi co-location relationship between the uplink RACH message and the SRS transmission. In a ninth aspect, alone or in combination with any of the first through eighth aspects, a fixed timing offset is configured between the uplink RACH message and the SRS transmission.

Figure 8:
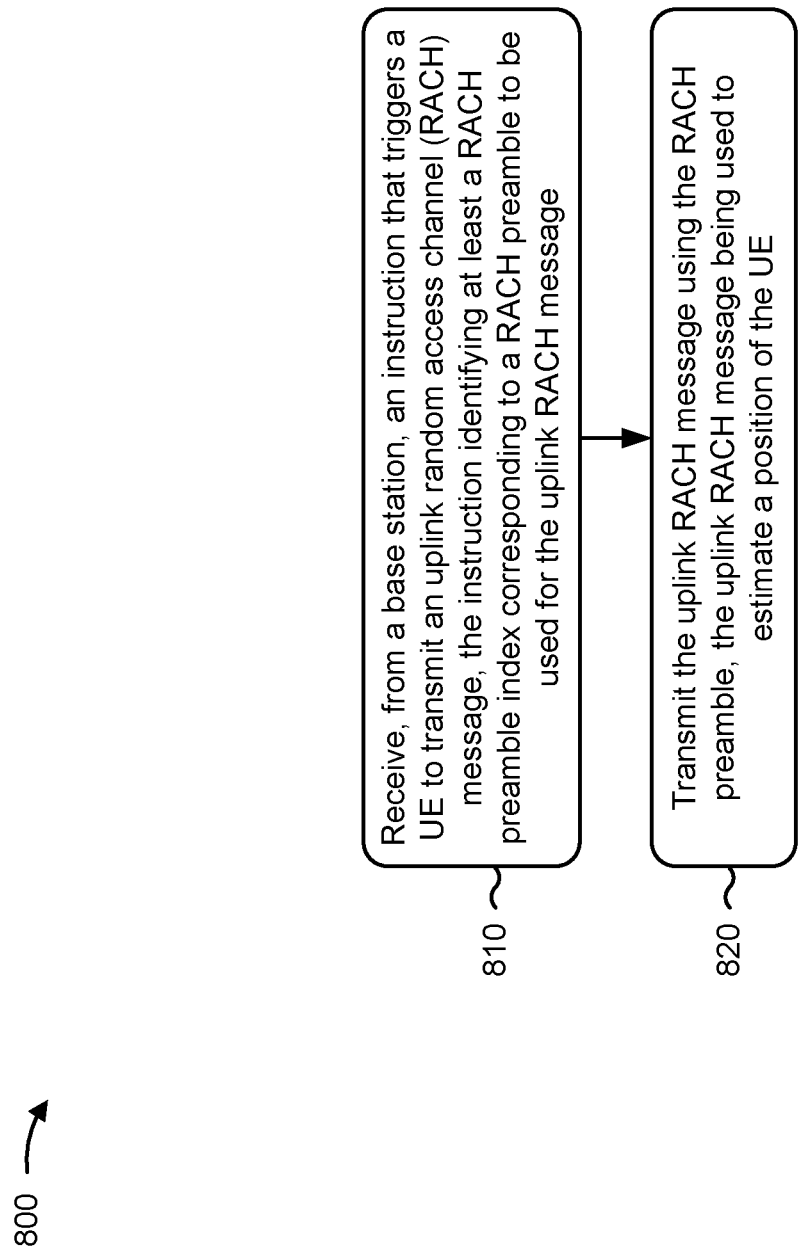
FIG. 8 is a diagram illustrating an example process performed by a UE in accordance with various aspects of the present disclosure.

FIG. 8 is a diagram illustrating an example process 800 performed, for example, by a UE in accordance with various aspects of the present disclosure. Example process 800 is an example where a UE (for example, UE 120) performs operations associated with UE position determination using an uplink RACH message.

As shown in FIG. 8, in some aspects, process 800 may include receiving, from a base station, an instruction that triggers the UE to transmit an uplink RACH message, the instruction identifying at least a RACH preamble index corresponding to a RACH preamble to be used for the uplink RACH message (block 810). For example, the UE (for example, using antenna 252, DEMOD 254, MIMO detector 256, receive processor 258, or controller/processor 280, among other examples) may receive, from a base station, an instruction that triggers the UE to transmit an uplink RACH message, as described above. The instruction may identify at least a RACH preamble index corresponding to a RACH preamble to be used for the uplink RACH message.

As further shown in FIG. 8, in some aspects, process 800 may include transmitting the uplink RACH message using the RACH preamble, the uplink RACH message being used to estimate a position of the UE (block 820). For example, the UE (for example, using controller/processor 280, transmit processor 264, TX MIMO processor 266, MOD 254, or antenna 252, among other examples) may transmit the uplink RACH message using the RACH preamble, as described above. The uplink RACH message may be used to estimate a position of the UE.

Process 800 may include additional aspects, such as any single aspect or any combination of aspects described below or in connection with one or more other processes described elsewhere herein.

In a first aspect, the uplink RACH message is used by a base station to estimate a position of the UE. In a second aspect, alone or in combination with the first aspect, process 800 includes receiving, from the base station, an estimate of a position of the UE based at least in part on transmitting the uplink RACH message. In a third aspect, alone or in combination with any of the first through second aspects, process 800 includes receiving, from the base station, information that identifies respective timings with which the uplink RACH message was received by a plurality of neighbor base stations; and estimating a position of the UE based at least in part on at least two of the respective timings with which the uplink RACH message was received by the plurality of neighbor base stations. In a fourth aspect, alone or in combination with any of the first through third aspects, the SRS transmission and the uplink RACH message are used to estimate a position of the UE.

In a fifth aspect, alone or in combination with any of the first through fourth aspects, process 800 includes receiving, from the base station, information that identifies respective timings with which the SRS transmission was received by a plurality of neighbor base stations; and estimating a position of the UE based at least in part on at least two of the respective timings with which the SRS transmission was received by the plurality of neighbor base stations. In a sixth aspect, alone or in combination with any of the first through fifth aspects, the instruction is received in a physical downlink control channel.

In a seventh aspect, alone or in combination with any of the first through sixth aspects, process 800 includes transmitting, to the base station, a request to trigger transmission of the uplink RACH message for positioning; and receiving the instruction that triggers the UE to transmit the uplink RACH message based at least in part on transmitting the request. In an eighth aspect, alone or in combination with any of the first through seventh aspects, process 800 includes detecting a time aliasing issue associated with determining a position of the UE; and transmitting the request based at least in part on detecting the time aliasing issue.

Figure 9:
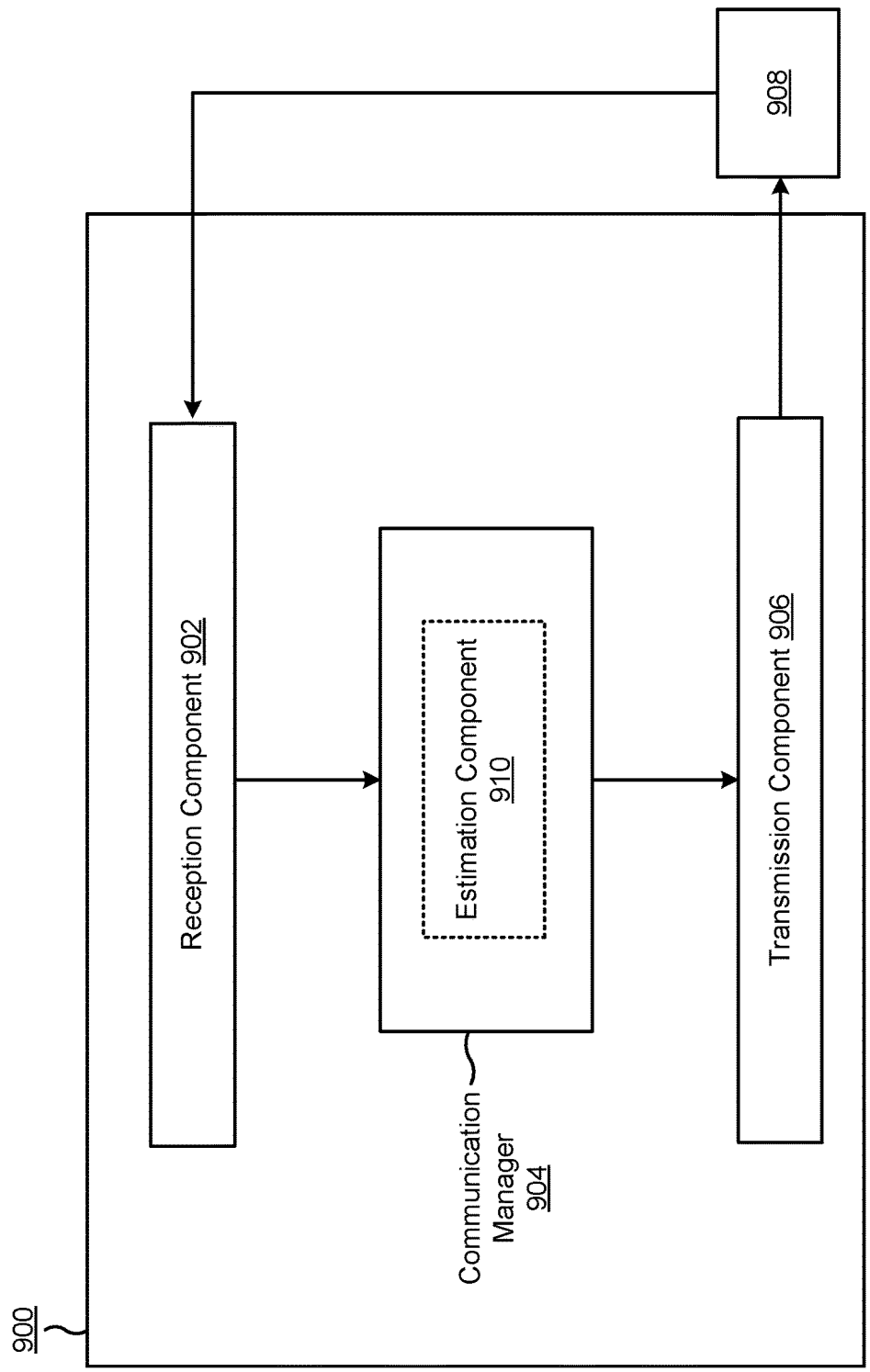
FIG. 9 is a block diagram of an example apparatus for wireless communication.

FIG. 9 is a block diagram of an example apparatus 900 for wireless communication. The apparatus 900 may be a base station, or a base station may include the apparatus 900. In some aspects, the apparatus 900 includes a reception component 902, a communication manager 904, and a transmission component 906, which may be in communication with one another (for example, via one or more buses). As shown, the apparatus 900 may communicate with another apparatus 908 (such as a UE, a base station, or another wireless communication device) using the reception component 902 and the transmission component 906.

In some aspects, the apparatus 900 may be configured to perform one or more operations described herein in connection with FIGS. 5 and 6. Additionally or alternatively, the apparatus 900 may be configured to perform one or more processes described herein, such as process 700 of FIG. 7. In some aspects, the apparatus 900 may include one or more components of the base station described above in connection with FIG. 2.

The reception component 902 may receive communications, such as reference signals, control information, data communications, or a combination thereof, from the apparatus 908. The reception component 902 may provide received communications to one or more other components of the apparatus 900, such as the communication manager 904. In some aspects, the reception component 902 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components. In some aspects, the reception component 902 may include one or more antennas, a demodulator, a MIMO detector, a receive processor, a controller/processor, a memory, or a combination thereof, of the base station described above in connection with FIG. 2.

The transmission component 906 may transmit communications, such as reference signals, control information, data communications, or a combination thereof, to the apparatus 908. In some aspects, the communication manager 904 may generate communications and may transmit the generated communications to the transmission component 906 for transmission to the apparatus 908. In some aspects, the transmission component 906 may perform signal processing on the generated communications (such as filtering, amplification, modulation, digital-to-analog conversion, multiplexing, interleaving, mapping, or encoding, among other examples), and may transmit the processed signals to the apparatus 908. In some aspects, the transmission component 906 may include one or more antennas, a modulator, a transmit MIMO processor, a transmit processor, a controller/processor, a memory, or a combination thereof, of the base station described above in connection with FIG. 2. In some aspects, the transmission component 906 may be collocated with the reception component 902 in a transceiver.

The communication manager 904 may transmit or may cause the transmission component 906 to transmit, to a UE, an instruction that triggers the UE to transmit an uplink RACH message. The instruction may identify at least a RACH preamble index corresponding to a RACH preamble to be used for the uplink RACH message. The communication manager 904 may transmit or may cause the transmission component 906 to transmit, to a plurality of neighbor base stations, information that identifies at least the RACH preamble index. The communication manager 904 may receive or may cause the reception component 902 to receive the uplink RACH message from the UE. The communication manager 904 may receive or may cause the reception component 902 to receive, from the plurality of neighbor base stations, feedback that indicates respective timings with which the uplink RACH message was received by the plurality of neighbor base stations. The communication manager 904 may estimate a position of the UE based at least in part on a timing with which the uplink RACH message was received by the base station and at least two of the respective timings with which the uplink RACH message was received by the plurality of neighbor base stations. In some aspects, the communication manager 904 may include a controller/processor, a memory, a scheduler, a communication unit, or a combination thereof, of the base station described above in connection with FIG. 2.

In some aspects, the communication manager 904 may include a set of components, such as an estimation component 910. Alternatively, the set of components may be separate and distinct from the communication manager 904. In some aspects, one or more components of the set of components may include or may be implemented within a controller/processor, a memory, a scheduler, a communication unit, or a combination thereof, of the base station described above in connection with FIG. 2. Additionally or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The estimation component 910 may estimate a position of the UE based at least in part on a timing with which the uplink RACH message was received by the base station and at least two of the respective timings with which the uplink RACH message was received by the plurality of neighbor base stations.

The number and arrangement of components shown in FIG. 9 are provided as an example. In practice, there may be additional components, fewer components, different components, or differently arranged components than those shown in FIG. 9. Furthermore, two or more components shown in FIG. 9 may be implemented within a single component, or a single component shown in FIG. 9 may be implemented as multiple, distributed components. Additionally or alternatively, a set of (one or more) components shown in FIG. 9 may perform one or more functions described as being performed by another set of components shown in FIG. 9.

Figure 10:
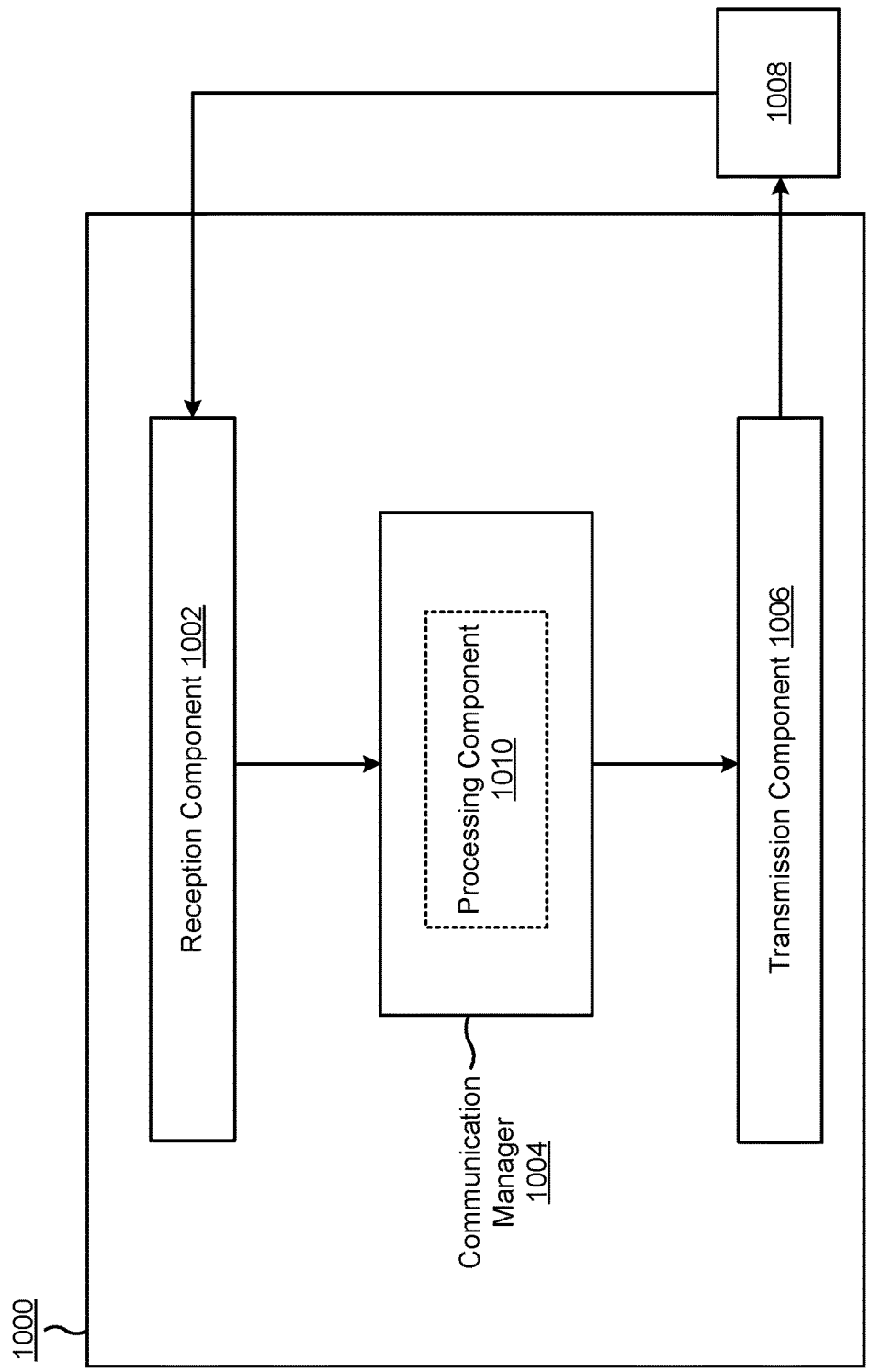
FIG. 10 is a block diagram of an example apparatus for wireless communication.

FIG. 10 is a block diagram of an example apparatus 1000 for wireless communication. The apparatus 1000 may be a UE, or a UE may include the apparatus 1000. In some aspects, the apparatus 1000 includes a reception component 1002, a communication manager 1004, and a transmission component 1006, which may be in communication with one another (for example, via one or more buses). As shown, the apparatus 1000 may communicate with another apparatus 1008 (such as a UE, a base station, or another wireless communication device) using the reception component 1002 and the transmission component 1006.

In some aspects, the apparatus 1000 may be configured to perform one or more operations described herein in connection with FIGS. 5 and 6. Additionally or alternatively, the apparatus 1000 may be configured to perform one or more processes described herein, such as process 800 of FIG. 8. In some aspects, the apparatus 1000 may include one or more components of the UE described above in connection with FIG. 2.

The reception component 1002 may receive communications, such as reference signals, control information, data communications, or a combination thereof, from the apparatus 1008. The reception component 1002 may provide received communications to one or more other components of the apparatus 1000, such as the communication manager 1004. In some aspects, the reception component 1002 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components. In some aspects, the reception component 1002 may include one or more antennas, a demodulator, a MIMO detector, a receive processor, a controller/processor, a memory, or a combination thereof, of the UE described above in connection with FIG. 2.

The transmission component 1006 may transmit communications, such as reference signals, control information, data communications, or a combination thereof, to the apparatus 1008. In some aspects, the communication manager 1004 may generate communications and may transmit the generated communications to the transmission component 1006 for transmission to the apparatus 1008. In some aspects, the transmission component 1006 may perform signal processing on the generated communications (such as filtering, amplification, modulation, digital-to-analog conversion, multiplexing, interleaving, mapping, or encoding, among other examples), and may transmit the processed signals to the apparatus 1008. In some aspects, the transmission component 1006 may include one or more antennas, a modulator, a transmit MIMO processor, a transmit processor, a controller/processor, a memory, or a combination thereof, of the UE described above in connection with FIG. 2. In some aspects, the transmission component 1006 may be collocated with the reception component 1002 in a transceiver.

The communication manager 1004 may receive or may cause the reception component 1002 to receive, from a base station, an instruction that triggers the apparatus 1000 to transmit an uplink RACH message. The instruction may identify at least a RACH preamble index corresponding to a RACH preamble to be used for the uplink RACH message. The communication manager 1004 may transmit or may cause the transmission component 2006 to transmit the uplink RACH message using the RACH preamble. The uplink RACH message being used to estimate a position of the apparatus 1000. In some aspects, the communication manager 1004 may include a controller/processor, a memory, or a combination thereof, of the UE described above in connection with FIG. 2.

In some aspects, the communication manager 1004 may include a set of components, such as a processing component 1010. Alternatively, the set of components may be separate and distinct from the communication manager 1004. In some aspects, one or more components of the set of components may include or may be implemented within a controller/processor, a memory, or a combination thereof, of the UE described above in connection with FIG. 2. Additionally or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The processing component 1010 may process an instruction that triggers the apparatus 1000 to transmit an uplink RACH message. The instruction may identify at least a RACH preamble index corresponding to a RACH preamble to be used for the uplink RACH message.

The number and arrangement of components shown in FIG. 10 are provided as an example. In practice, there may be additional components, fewer components, different components, or differently arranged components than those shown in FIG. 10. Furthermore, two or more components shown in FIG. 10 may be implemented within a single component, or a single component shown in FIG. 10 may be implemented as multiple, distributed components. Additionally or alternatively, a set of (one or more) components shown in FIG. 10 may perform one or more functions described as being performed by another set of components shown in FIG. 10.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, or a combination of hardware and software. As used herein, a processor is implemented in hardware, firmware, or a combination of hardware and software.

Some aspects are described herein in connection with thresholds. As used herein, satisfying a threshold may refer to a value being greater than the threshold, greater than or equal to the threshold, less than the threshold, less than or equal to the threshold, equal to the threshold, or not equal to the threshold, among other examples.

It will be apparent that systems or methods described herein may be implemented in different forms of hardware, firmware, or a combination of hardware and software. The actual specialized control hardware or software code used to implement these systems or methods is not limiting of the aspects. Thus, the operation and behavior of the systems or methods were described herein without reference to specific software code—it being understood that software and hardware can be designed to implement the systems or methods based, at least in part, on the description herein.

Even though particular combinations of features are recited in the claims or disclosed in the specification, these combinations are not intended to limit the disclosure of various aspects. In fact, many of these features may be combined in ways not specifically recited in the claims or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (for example, a-a, a-a-a, a-a-b, a-a-c, a-b-b, a-c-c, b-b, b-b-b, b-b-c, c-c, and c-c-c or any other ordering of a, b, and c).

No element, act, or instruction used herein is to be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (for example, related items, unrelated items, or a combination of related and unrelated items, among other examples), and may be used interchangeably with "one or more." Where only one item is intended, the phrase "only one" or similar language is used. Also, as used herein, the terms "has," "have," "having," or similar terms are intended to be open-ended terms. Further, the phrase "based on" is intended to mean "based, at least in part, on" unless explicitly stated otherwise.

What is claimed is:

1. A method of wireless communication performed by a base station, comprising:
   transmitting, to a user equipment (UE), an instruction that triggers the UE to transmit an uplink random access channel (RACH) message, the instruction identifying at least a RACH preamble index corresponding to a RACH preamble to be used for the uplink RACH message;
   transmitting, to a plurality of neighbor base stations, information that identifies at least the RACH preamble index;
   receiving the uplink RACH message from the UE;
   receiving, from the plurality of neighbor base stations, feedback that indicates respective timings with which the uplink RACH message was received by the plurality of neighbor base stations; and
   estimating a position of the UE based at least in part on a timing with which the uplink RACH message was received by the base station and at least two of the respective timings with which the uplink RACH message was received by the plurality of neighbor base stations.

2. The method of claim 1, further comprising transmitting, to the UE, information that identifies the respective timings with which the uplink RACH message was received by the plurality of neighbor base stations.

3. The method of claim 1, wherein the instruction is transmitted in a physical downlink control channel.

4. The method of claim 1, wherein the uplink RACH message is received via contiguous resource blocks.

5. The method of claim 1, further comprising:
   receiving a sounding reference signal (SRS) transmission from the UE;
   receiving, from the plurality of neighbor base stations, feedback that indicates respective timings with which the SRS transmission was received by the plurality of neighbor base stations; and
   estimating the position of the UE based at least in part on the timing with which the uplink RACH message was received by the base station, the at least two of the respective timings with which the uplink RACH message was received by the plurality of neighbor base stations, a timing with which the SRS transmission was received by the base station, and at least two of the respective timings with which the SRS transmission was received by the plurality of neighbor base stations.

6. The method of claim 5, wherein the SRS transmission is received via non-contiguous resource blocks.

7. The method of claim 5, further comprising selecting a timing, from multiple possible timings corresponding to multiple peak power measurements of the SRS transmission, based at least in part on the uplink RACH message.

8. The method of claim 5, wherein the uplink RACH message and the SRS transmission are quasi co-located.

9. The method of claim 5, further comprising transmitting a configuration that indicates a quasi co-location relationship between the uplink RACH message and the SRS transmission.

10. The method of claim 5, wherein a fixed timing offset is configured between the uplink RACH message and the SRS transmission.

11. A method of wireless communication performed by a user equipment (UE), comprising:
    receiving, from a base station, an instruction that triggers the UE to transmit an uplink random access channel (RACH) message, the instruction identifying at least a RACH preamble index corresponding to a RACH preamble to be used for the uplink RACH message;
    transmitting the uplink RACH message using the RACH preamble;
    receiving, from the base station, information that identifies respective timings with which the uplink RACH message was received by a plurality of neighbor base stations; and
    estimating a position of the UE based at least in part on at least two of the respective timings with which the uplink RACH message was received by the plurality of neighbor base stations.

12. The method of claim 11, wherein the uplink RACH message is used by a base station to estimate a position of the UE.

13. The method of claim 11, further comprising receiving, from the base station, an estimate of a position of the UE based at least in part on transmitting the uplink RACH message.

14. The method of claim 11, further comprising transmitting a sounding reference signal (SRS) transmission, wherein the SRS transmission and the uplink RACH message are used to estimate a position of the UE.

15. The method of claim 14, further comprising:
    receiving, from the base station, information that identifies respective timings with which the SRS transmission was received by a plurality of neighbor base stations; and
    estimating a position of the UE based at least in part on at least two of the respective timings with which the SRS transmission was received by the plurality of neighbor base stations.

16. The method of claim 11, wherein the instruction is received in a physical downlink control channel.

17. The method of claim 11, further comprising:
    transmitting, to the base station, a request to trigger transmission of the uplink RACH message for positioning; and
    receiving the instruction that triggers the UE to transmit the uplink RACH message based at least in part on transmitting the request.

18. The method of claim 17, further comprising:
detecting a time aliasing issue associated with determining a position of the UE; and
transmitting the request based at least in part on detecting the time aliasing issue.

19. A base station for wireless communication, comprising:
a memory; and
one or more processors operatively coupled to the memory, the memory and the one or more processors configured to:
transmit, to a user equipment (UE), an instruction that triggers the UE to transmit an uplink random access channel (RACH) message, the instruction identifying at least a RACH preamble index corresponding to a RACH preamble to be used for the uplink RACH message;
transmit, to a plurality of neighbor base stations, information that identifies at least the RACH preamble index;
receive the uplink RACH message from the UE;
receive, from the plurality of neighbor base stations, feedback that indicates respective timings with which the uplink RACH message was received by the plurality of neighbor base stations; and
estimate a position of the UE based at least in part on a timing with which the uplink RACH message was received by the base station and at least two of the respective timings with which the uplink RACH message was received by the plurality of neighbor base stations.

20. The base station of claim 19, wherein the one or more processors are further configured to transmit, to the UE, information that identifies the respective timings with which the uplink RACH message was received by the plurality of neighbor base stations.

21. The base station of claim 19, wherein the instruction is transmitted in a physical downlink control channel.

22. The base station of claim 19, wherein the uplink RACH message is received via contiguous resource blocks.

23. The base station of claim 19, wherein the one or more processors are further configured to:
receive a sounding reference signal (SRS) transmission from the UE;
receive, from the plurality of neighbor base stations, feedback that indicates respective timings with which the SRS transmission was received by the plurality of neighbor base stations; and
estimate the position of the UE based at least in part on the timing with which the uplink RACH message was received by the base station, the at least two of the respective timings with which the uplink RACH message was received by the plurality of neighbor base stations, a timing with which the SRS transmission was received by the base station, and at least two of the respective timings with which the SRS transmission was received by the plurality of neighbor base stations.

24. A user equipment (UE) for wireless communication, comprising:
a memory; and
one or more processors operatively coupled to the memory, the memory and the one or more processors configured to:
receive, from a base station, an instruction that triggers the UE to transmit an uplink random access channel (RACH) message, the instruction identifying at least a RACH preamble index corresponding to a RACH preamble to be used for the uplink RACH message;
transmit the uplink RACH message using the RACH preamble;
receive, from the base station, information that identifies respective timings with which the uplink RACH message was received by a plurality of neighbor base stations; and
estimate a position of the UE based at least in part on at least two of the respective timings with which the uplink RACH message was received by the plurality of neighbor base stations.

25. The UE of claim 24, wherein the uplink RACH message is used by a base station to estimate a position of the UE.

26. The UE of claim 24, wherein the one or more processors are further configured to receive, from the base station, an estimate of a position of the UE based at least in part on transmitting the uplink RACH message.

27. The UE of claim 24, wherein the one or more processors are further configured to transmit a sounding reference signal (SRS) transmission, wherein the SRS transmission and the uplink RACH message are used to estimate a position of the UE.

28. The UE of claim 27, wherein the one or more processors are further configured to:
receive, from the base station, information that identifies respective timings with which the SRS transmission was received by a plurality of neighbor base stations; and
estimate a position of the UE based at least in part on at least two of the respective timings with which the SRS transmission was received by the plurality of neighbor base stations.

29. A method of wireless communication performed by a user equipment (UE), comprising:
receiving, from a base station, an instruction that triggers the UE to transmit an uplink random access channel (RACH) message, the instruction identifying at least a RACH preamble index corresponding to a RACH preamble to be used for the uplink RACH message;
transmitting the uplink RACH message using the RACH preamble;
transmitting, to the base station, a request to trigger transmission of the uplink RACH message for positioning; and
receiving the instruction that triggers the UE to transmit the uplink RACH message based at least in part on transmitting the request.

\* \* \* \* \*